US010979803B2

(12) United States Patent
Miyama et al.

(10) Patent No.: US 10,979,803 B2
(45) Date of Patent: Apr. 13, 2021

(54) COMMUNICATION APPARATUS, COMMUNICATION METHOD, PROGRAM, AND TELEPRESENCE SYSTEM

(71) Applicant: SONY CORPORATION, Tokyo (JP)

(72) Inventors: Seiji Miyama, Kanagawa (JP); Yoshihiro Manabe, Tokyo (JP); Ryuichi Namba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/495,267

(22) PCT Filed: Apr. 12, 2018

(86) PCT No.: PCT/JP2018/015353
§ 371 (c)(1),
(2) Date: Sep. 18, 2019

(87) PCT Pub. No.: WO2018/198790
PCT Pub. Date: Nov. 1, 2018

(65) Prior Publication Data
US 2020/0092639 A1    Mar. 19, 2020

(30) Foreign Application Priority Data

Apr. 26, 2017 (JP) .............................. JP2017-087428

(51) Int. Cl.
*H04R 1/40* (2006.01)
*H04S 7/00* (2006.01)
(Continued)

(52) U.S. Cl.
CPC ............. *H04R 1/403* (2013.01); *H04N 5/50* (2013.01); *H04N 7/142* (2013.01); *H04R 1/406* (2013.01);
(Continued)

(58) Field of Classification Search
None
See application file for complete search history.

(56) References Cited

U.S. PATENT DOCUMENTS 7,843,486 B1 *  11/2010  Blair ..................... H04M 3/568
                                                        348/14.01
2002/0140804 A1 * 10/2002  Colmenarez .......... G01S 3/8083
                                                        348/14.08
(Continued)

FOREIGN PATENT DOCUMENTS

JP    2001-036881 A    2/2001
JP    2005-086363 A    3/2005
(Continued)

*Primary Examiner* — James K Mooney
(74) *Attorney, Agent, or Firm* — Paratus Law Group, PLLC

(57) ABSTRACT

The present disclosure relates to a communication apparatus, a communication method, a program, and a telepresence system that can perform communication more smoothly. A sound processing unit processes, in accordance with a setting for a specific sound, the sound in performing communication using a video and a voice. For example, the sound processing unit performs processing on a sound input by an input unit, and the sound processed by the sound processing unit, and the original sound input by the input unit are both transmitted. Furthermore, the sound processing unit performs processing on a sound received by a receiving unit configured to receive a sound transmitted from another communication apparatus, and causes the sound to be output from an output unit. The present technology can be applied to a telepresence system, for example.

10 Claims, 14 Drawing Sheets

(51) Int. Cl.
  *H04N 5/50*     (2006.01)
  *H04N 7/14*     (2006.01)
  *H04R 3/00*     (2006.01)
  *H04R 3/12*     (2006.01)

(52) U.S. Cl.
  CPC .............. *H04R 3/005* (2013.01); *H04R 3/12* (2013.01); *H04S 7/307* (2013.01); *H04S 7/40* (2013.01); *H04R 2201/403* (2013.01); *H04R 2430/21* (2013.01); *H04S 2420/13* (2013.01)

(56) References Cited

U.S. PATENT DOCUMENTS

| | | | |
|---|---|---|---|
| 2016/0135737 A1* | 5/2016 | Bowers | A61B 5/165 |
| | | | 704/270 |
| 2018/0139562 A1* | 5/2018 | Eronen | H04S 7/30 |
| 2018/0167515 A1* | 6/2018 | Shi | G10L 21/02 |

FOREIGN PATENT DOCUMENTS

| | | |
|---|---|---|
| JP | 2011-035524 A | 2/2011 |
| JP | 2012-248986 A | 12/2012 |
| WO | WO 2009/119288 A1 | 10/2009 |

\* cited by examiner

FIG. 9
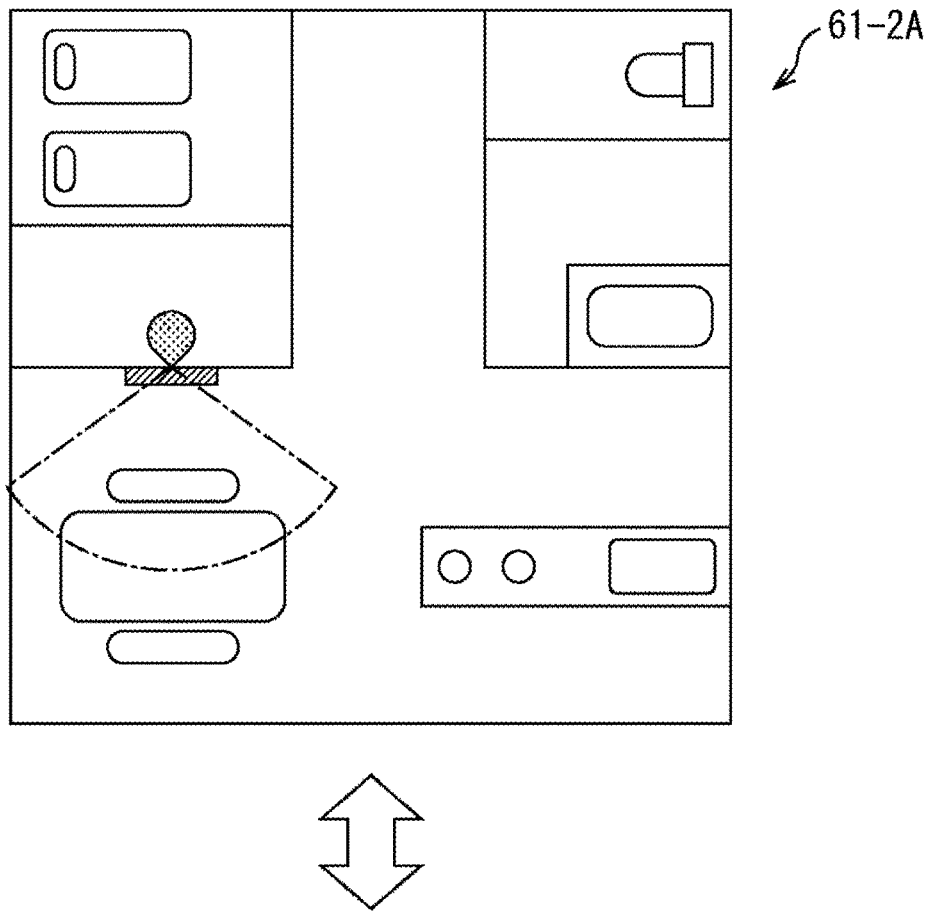
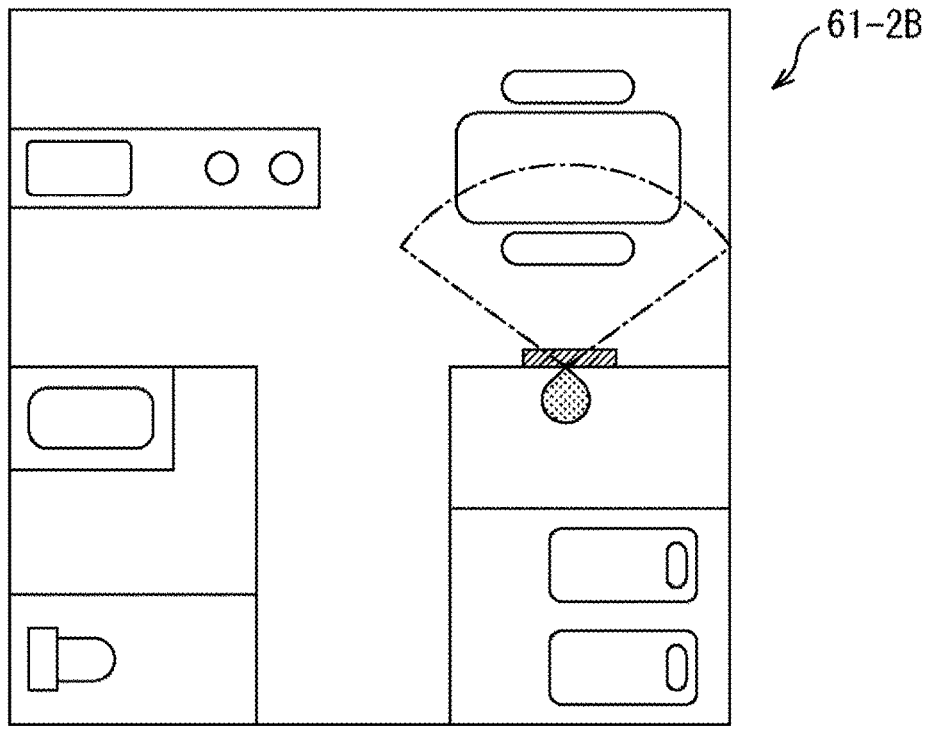

| ORIENTATION | VOLUME | PITCH | TONE | LOCALIZATION POSITION |
|---|---|---|---|---|
| 45 | 5 | 200Hz Down | | |
| 225 | 8 | | | 45 |

COMMUNICATION APPARATUS, COMMUNICATION METHOD, PROGRAM, AND TELEPRESENCE SYSTEM

CROSS REFERENCE TO PRIOR APPLICATION

This application is a National Stage Patent Application of PCT International Patent Application No. PCT/JP2018/015353 (filed on Apr. 12, 2018) under 35 U.S.C. § 371, which claims priority to Japanese Patent Application No. 2017-087428 (filed on Apr. 26, 2017), which are all hereby incorporated by reference in their entirety.

TECHNICAL FIELD

The present disclosure relates to a communication apparatus, a communication method, a program, and a telepresence system, and particularly to a communication apparatus, a communication method, a program, and a telepresence system that can perform communication more smoothly.

BACKGROUND ART

Conventionally, it has been possible for users existing at remote locations to perform more intimate communication while looking at each other, using a communication system that uses a video and a voice.

For example, in existing video chat that uses a communication apparatus such as a personal computer and a tablet terminal, the communication system is used in such a manner that the users make a conversation with each other while facing displays of communication apparatuses. Furthermore, in recent years, there has been proposed the use of a telepresence system that can perform communication with realistic feeling as if users existing at remote locations actually faced each other.

For example, Patent Document 1 discloses a realistic television conference apparatus in which a video and a sound image direction match, by localizing the sound image direction as if a sound was produced by a speaker in the video.

CITATION LIST

Patent Document

Patent Document 1: Japanese Patent Application Laid-Open No. 2012-248986

SUMMARY OF THE INVENTION

Problems to be Solved by the Invention

Meanwhile, by using the aforementioned telepresence system, each of the users can perform natural communication in such a manner that the existence of a partner can be naturally felt as if a space of the partner side was adjoining via a virtual window. In this manner, in the telepresence system that performs communication as if the partner existed in the adjoining space, if a sound disturbing the communication is also transmitted, it is assumed that it becomes difficult to perform communication smoothly.

The present disclosure has been devised in view of such situations, and enables communication to be performed more smoothly.

Solutions to Problems

A communication apparatus according to an aspect of the present disclosure includes a sound processing unit configured to process, in accordance with a setting for a specific sound, the sound in performing communication using a video and a voice.

A communication method or a program according to an aspect of the present disclosure includes a step of processing, in accordance with a setting for a specific sound, the sound in performing communication using a video and a voice.

A telepresence system according to an aspect of the present disclosure includes a sound processing unit configured to process, in accordance with a setting for a specific sound, the sound in performing communication using a video and a voice.

In an aspect of the present disclosure, in accordance with a setting for a specific sound, the sound is processed in performing communication using a video and a voice.

Effects of the Invention

According to an aspect of the present disclosure, it is possible to perform communication more smoothly.

BRIEF DESCRIPTION OF DRAWINGS

FIG. 9 is a diagram illustrating a second display example of a setting screen of the other space.

MODE FOR CARRYING OUT THE INVENTION

Hereinafter, a specific embodiment to which the present technology is applied will be described in detail with reference to the drawings.

Overview of Telepresence System

First of all, an overview of a telepresence system will be described with reference to FIG. 1.

Figure 1:
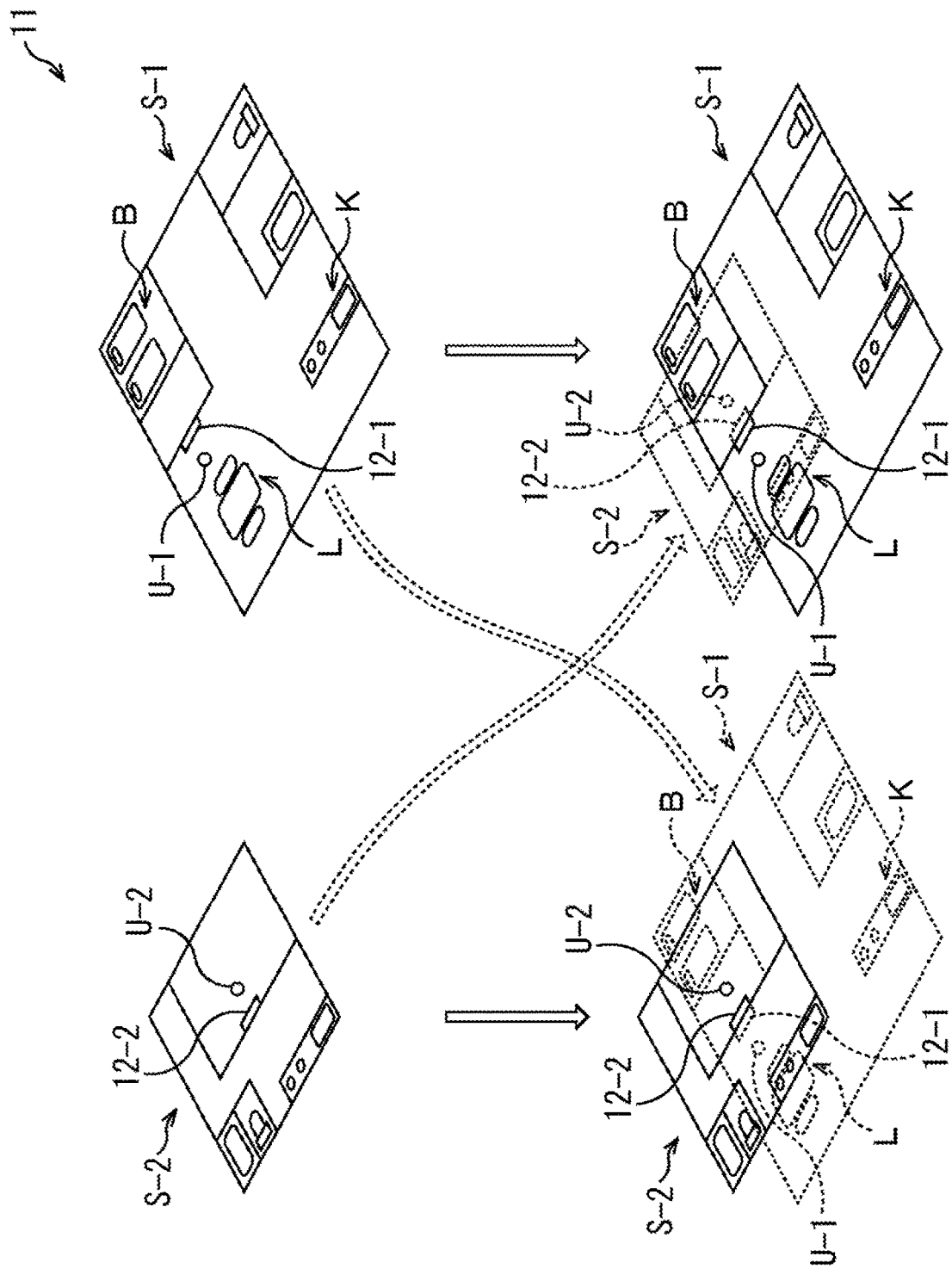
FIG. 1 is a diagram describing an overview of a telepresence system.

In a telepresence system 11 illustrated in FIG. 1, a communication apparatus 12-1 disclosed in a space S-1 in which a user U-1 exists, and a communication apparatus 12-2 disclosed in a space S-2 in which a user U-2 exists transmit and receive videos and voices to and from each other. The user U-1 and the user U-2 can thereby perform communication using the telepresence system 11 as if the space S-1 and the space S-2 adjoined each other.

For example, the communication apparatus 12-1 displays a video of the space S-2 that has been captured by the communication apparatus 12-2, and outputs a voice in the space S-2 that has been collected by the communication apparatus 12-2. With this configuration, for example, as illustrated in the lower right of FIG. 1, the user U-1 can feel as if the space S-2 visually overlapped the space S-1 as indicated by dotted lines, in such an arrangement that the communication apparatus 12-2 is located on the other side of the communication apparatus 12-1 so to face the communication apparatus 12-1.

Similarly, the communication apparatus 12-2 displays a video of the space S-1 that has been captured by the communication apparatus 12-1, and outputs a voice in the space S-1 that has been collected by the communication apparatus 12-1. With this configuration, for example, as illustrated is the lower left of FIG. 1, the user U-2 can feel as if the space S-1 visually overlapped the space S-2 as indicated by dotted lines, in such an arrangement that the communication apparatus 12-1 is located on the other side of the communication apparatus 12-2 so to face the communication apparatus 12-2.

Accordingly, by the telepresence system 11, for example, the user U-1 can naturally perform communication with the user U-2 via the communication apparatuses 12-1 and 12-2, as if the user U-2 existed in an adjoining space. Similarly, the user U2 can also naturally perform communication as if the U-1 existed in an adjoining space.

In other words, in the telepresence system 11, it is possible to perform communication more smoothly while feeling the existence of a partner as if a living space of the partner overlapped a living space of itself, without intentionally performing active communication.

Meanwhile, depending on the user using such a telepresence system 11, it is assumed that the user desires to control a sound disturbing communication.

Specifically, it is assumed that the user U-1 desires to control sounds in such a manner that a sound in a living room L in which the communication apparatus 12-1 is disposed may be conveyed to a communication partner side, but a sound in a more private bed room B is undesired to be conveyed to the communication partner side. Furthermore, it is assumed that the user U-2 desires to control sounds in such a manner that the user U-2 is not pleased with a sound in a kitchen K (for example, a sound of flowing tap water, a sound produced when dishes are stacked, etc.), and the user U-2 desires to suppress the output of such a sound.

Thus, the telepresence system 11 can have a configuration in which a user can arbitrarily control a specific sound. In other words, a user can perform control in such a manner that, among sounds in a space in which the user exists (hereinafter, appropriately referred to as an own space), only a specific sound is transmitted to a partner side (or only a specific sound is not transmitted). Furthermore, a user can perform control in such a manner that, among sounds in a space on a side of a partner with which communication is performed (hereinafter, appropriately referred to as other space), only a specific sound is output (or only a specific sound is not output).

With this configuration, by avoiding the generation of a harmful effect caused by a sound disturbing communication, the telepresence system 11 can cause users to communicate with each other more smoothly.

Note that the communication apparatus 12-1 and the communication apparatus 12-2 used in the telepresence system 11 can have a common configuration, and in a case where there is no need to distinguish the communication apparatus 12-1 and the communication apparatus 12-2 from each other, the communication apparatus 12-1 and the communication apparatus 12-2 will be hereinafter referred to as communication apparatuses 12.

Configuration Example of Communication Apparatus

Figure 2:
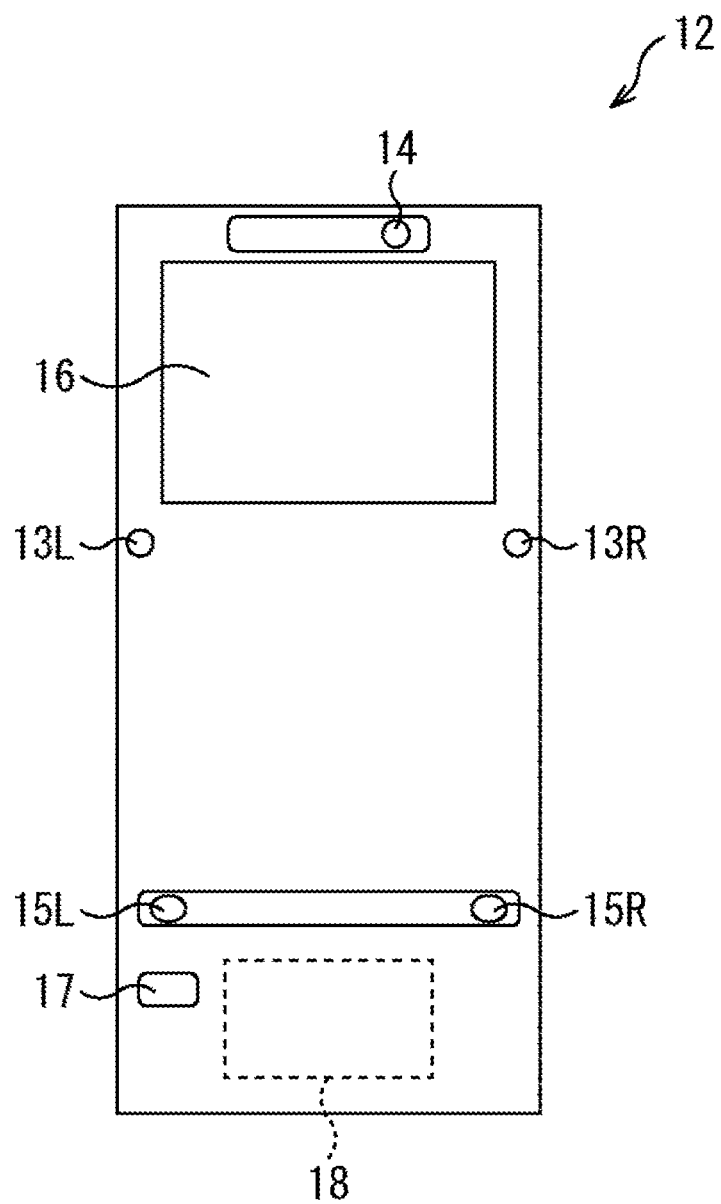
FIG. 2 is a diagram illustrating an external configuration example of a communication apparatus.

FIG. 2 is a diagram illustrating an external configuration example of a communication apparatus 12.

As illustrated in FIG. 2, the communication apparatus 12 includes two microphones 13L and 13R, a camera 14, two speakers 15L and 15R, a display 16, a manipulation signal input unit 17, and a control apparatus 18.

The microphones 13L and 13R collect sounds in an own space in which the communication apparatus 12 is disclosed. Then, an acoustic signal representing the sounds collected by the microphones 13L and 13R is transmitted another communication apparatus 12.

The camera 14 captures an image of the own space provided anterior to the communication apparatus 12. Then, a video signal representing a video captured by the camera 14 is transmitted to the other communication apparatus 12.

The speakers 15L and 15R outputs a sound obtained by reproducing the acoustic signal transmitted from the other communication apparatus 12, in other words, outputs a sound in the other space in which the other communication apparatus 12 is disclosed.

The display 16 displays a video obtained by reproducing the video signal transmitted from the other communication apparatus 12, in other words, displays a video obtained by capturing an image of the front side of the communication apparatus 12 in the other space is captured. Furthermore, the display 16 can display a setting screen used in performing settings for controlling a specific sound.

The manipulation signal input unit 17 inputs, to the communication apparatus 12, a manipulation signal transmitted from a remote controller manipulated at user's hand, for example. For example, using the remote controller, the user can perform settings for controlling a specific sound, via the setting screen displayed on the display 16, and the manipulation signal input unit 17 inputs a manipulation signal to be used in performing the settings.

The control apparatus 18 controls the components constituting the communication apparatus 12, and performs control in such a manner that communication is performed more smoothly using the communication apparatus 12.

The communication apparatus 12 having such a configuration can transmit a video and a sound in the own space, and also displays a video of the other space and output a sound in the other space. At this time, in the communication apparatus 12, a full-length video of the other space is displayed on the display 16, and sounds are output from the speakers 15L and 15R so as to be heard from a direction corresponding to a position of a sound source in the other space. With this configuration, using the communication apparatuses 12, it is possible to perform communication in which the existences of the users can be naturally felt as if the own space and the other space were adjoining via the display 16 serving as a virtual window.

Note that the external configuration of the communication apparatus 12 is not limited to the configuration example as illustrated in FIG. 2, and various modes can be employed.

Figure 3:
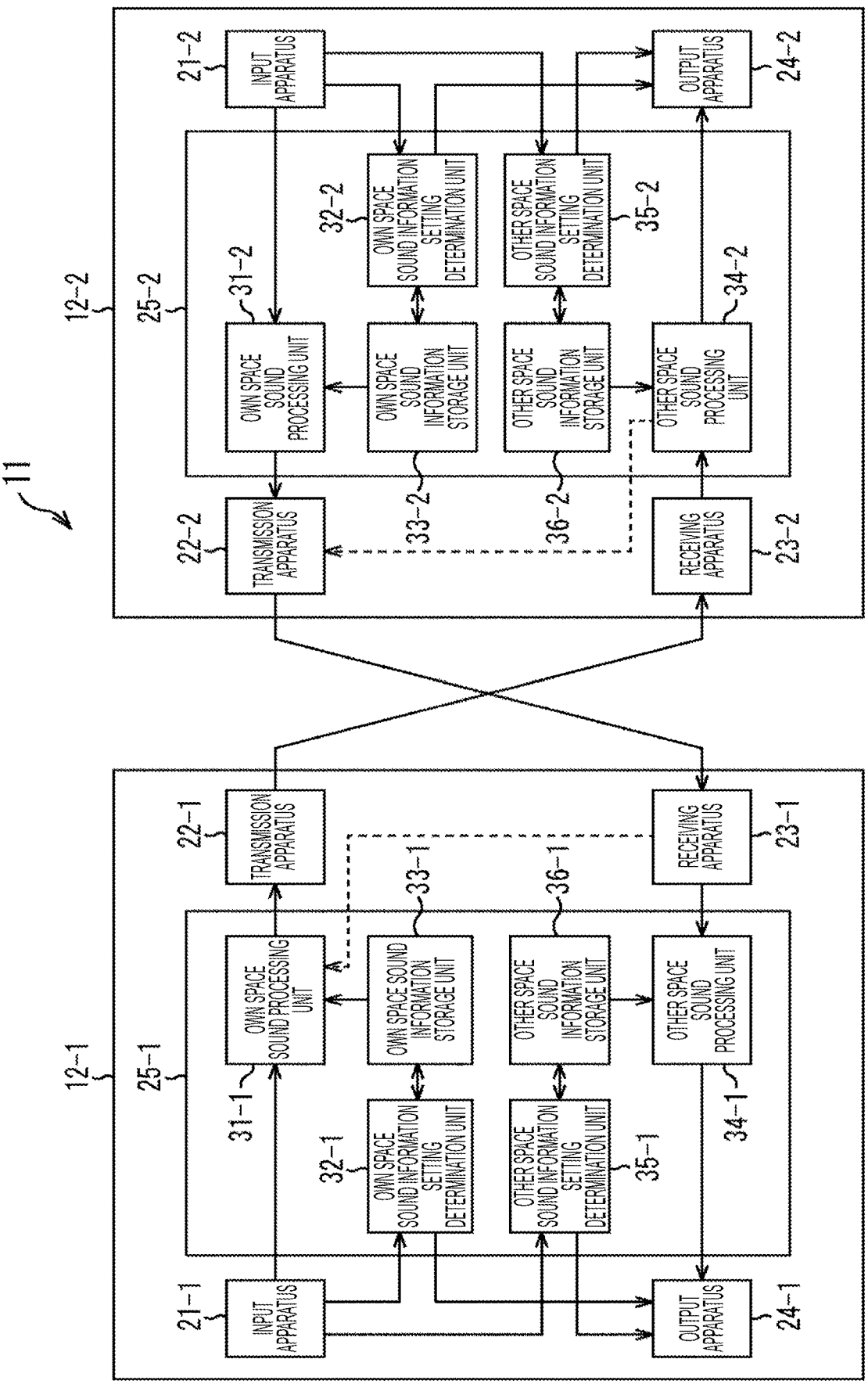
FIG. 3 is a block diagram illustrating a configuration example of as embodiment of a telepresence system to which the present technology is applied.

Next, a functional configuration of the communication apparatus 12 will be described with reference to FIG. 3. FIG. 3 illustrates a configuration example of an embodiment of the telepresence system 11 including the communication apparatuses 12-1 and 12-2.

As illustrated in FIG. 3, the communication apparatus 12 includes an input apparatus 21, a transmission apparatus 22, a receiving apparatus 23, an output apparatus 24, and a sound processing unit 25.

The input apparatus 21 includes the microphones 13L and 13R, the camera 14, the manipulation signal input unit 17, and the like in FIG. 2, for example, and inputs various signals to the communication apparatus 12. In other words, the input apparatus 21 inputs an acoustic signal representing sounds in own space that have been collected by the microphones 13L and 13R, to an own space sound processing unit 31 of the sound processing unit 25, and inputs a video signal representing a video of the own space that has been captured by the camera 14, to the transmission apparatus 22. Furthermore, in setting sound information using setting screens as illustrated in FIGS. 4 to 9 as described later, the input apparatus 21 inputs a manipulation signal input to the manipulation signal input unit 17 in accordance with a manipulation of the user performed on a remote controller (not illustrated), to an own space sound information setting determination unit 32 or the other space sound information setting determination unit 35 of the sound processing unit 25.

Furthermore, in addition to the microphones 13L and 13R incorporated in the communication apparatus 12, the input apparatus 21 can also include a microphone (not illustrated) independently installed in each room of the space S-1, in which the communication apparatus 12 is disclosed, such as the kitchen K or the bed room B in FIG. 1, for example. In this case, the microphones and the communication apparatus 12 disclosed in these rooms can be connected in a wireless or wired manner.

Note that the input apparatus 21 may include, for example, a microphone array (not illustrated) in which a plurality of microphones is disclosed in an array, a depth sensor (not illustrated) that measures a distance to a subject to be image-captured by the camera 14, or the like.

The transmission apparatus 22 transmits an acoustic signal obtained by the sound processing unit 25 performing sound processing on an acoustic signal input from the input apparatus 21 to the sound processing unit 25, to the other communication apparatus 12 via a network such as the Internet, for example. Furthermore, the transmission apparatus 22 can transmit an acoustic signal not, subjected to the sound processing performed by the sound processing unit 25, in other words, an original acoustic signal input to the input apparatus 21, to the other communication apparatus 12. Moreover, the transmission apparatus 22 can transmit a video signal representing a video captured by the camera 14 in FIG. 2, or sound information set by the user for controlling a specific sound.

The receiving apparatus 23 receives the acoustic signal transmitted from the other communication apparatus 12 via the network (not illustrated), and supplies the acoustic signal to the sound processing unit 25. Furthermore, the receiving apparatus 23 receives the video signal transmitted from the other communication apparatus 12, and supplies the video signal to the output apparatus 24, or receives the sound information set by the other user, and stores the sound information into an own space sound information storage unit 33 of the sound processing unit 25.

The output apparatus 24 includes, for example, the speakers 15L and 15R or the display 16 in FIG. 2, or the like, and outputs a sound in the other space from the speakers 15L and 15R, and displays a video of the other space on the display 16. In other words, the output apparatus 24 outputs, from the speakers 15L and 15R, a sound obtained by reproducing an acoustic signal obtained by the sound processing unit 25 performing sound processing on an acoustic signal received by the receiving apparatus 23.

Furthermore, in addition to the speakers 15L and 15R incorporated in the communication apparatus 12, the output apparatus 24 can also include a speaker (not illustrated) independently installed in each room, in which the communication apparatus 12 is disclosed, such as the kitchen K or the bed room B in FIG. 1, for example. In this case, the speakers and the communication apparatus 12 disclosed in these rooms can be connected in a wireless or wired manner. Moreover, aside from the display 16, the output apparatus 24 may display a video using a projector (not illustrated).

The sound processing unit 25 performs sound processing in accordance with control performed on a specific sound in the own space by the user, on an acoustic signal input by the input apparatus 21, and transmits the processed acoustic signal to the transmission apparatus 22. Furthermore, the sound processing unit 25 performs sound processing in accordance with control performed on a specific sound in the other space by the user, on an acoustic signal supplied from the receiving apparatus 23, and outputs the processed acoustic signal using the output apparatus 24.

As illustrated in FIG. 3, the sound processing unit 25 includes the own space sound processing unit 31, the own space sound information setting determination unit 32, the own space sound information storage unit 33, an other space sound processing unit 34, an other space sound information setting determination unit 35, and an other space sound information storage unit 36.

In accordance with sound information regarding the own space that is stored in the own space sound information storage unit 33 (setting for a specific sound in the own space), the own space sound processing unit 31 performs sound processing on a sound in the own space, in other words, sound processing on an acoustic signal input by the input apparatus 21.

In performing settings for the sound information regarding the own space that is stored in the own space sound information storage unit 33, the own space sound information setting determination unit 32 determines whether or not settings can be performed by the user (within an allowable range), and in a case where settings can be performed, performs the settings. For example, in a case where settings are performed so finely that location measurement of a sound cannot be performed, in other words, in a case where the settings do not fall within a range in which designation by the user is allowed, the own space sound information setting determination unit 32 determines that the settings cannot be performed, and presents an error.

In accordance with the control on a sound in the own space that is performed by the user, the own space sound information storage unit 33 stores sound information including various setting items that is set for a sound in the own space.

In accordance with sound information regarding the other space that as stored in the other space sound information storage unit 36 (setting for a specific sound in the other space), the other space sound processing unit 34 performs sound processing on a sound in the other space, in other words, sound processing on an acoustic signal supplied from the receiving apparatus 23.

In performing settings for the sound information regarding the other space that is stored in the other space sound information storage unit 36, the other space sound information setting determination unit 35 determines whether or not settings can be performed by the user (within an allowable range), and in a case where settings can be performed, performs the settings. For example, in a case where settings are performed so finely that location measurement of a sound cannot be performed, in other words, in a case where the settings do not fall within a range in which designation by the user is allowed, the other space sound information setting determination unit 35 determines that the settings cannot be performed, and presents an error.

In accordance with the control on a sound in the other space that is performed by the user, the other space sound information storage unit 36 stores sound information including various setting items that is set for a sound in the other space.

Setting Screen

A setting screen to be used for setting a sound in the own space or the other space in the communication apparatus 12 will be described with reference to FIGS. 4 to 9. Note that, hereinafter, the description will be given assuming that the space S-1 illustrated in FIG. 1 is regarded as the own space and the space S-2 is regarded as the other space.

Figure 4:
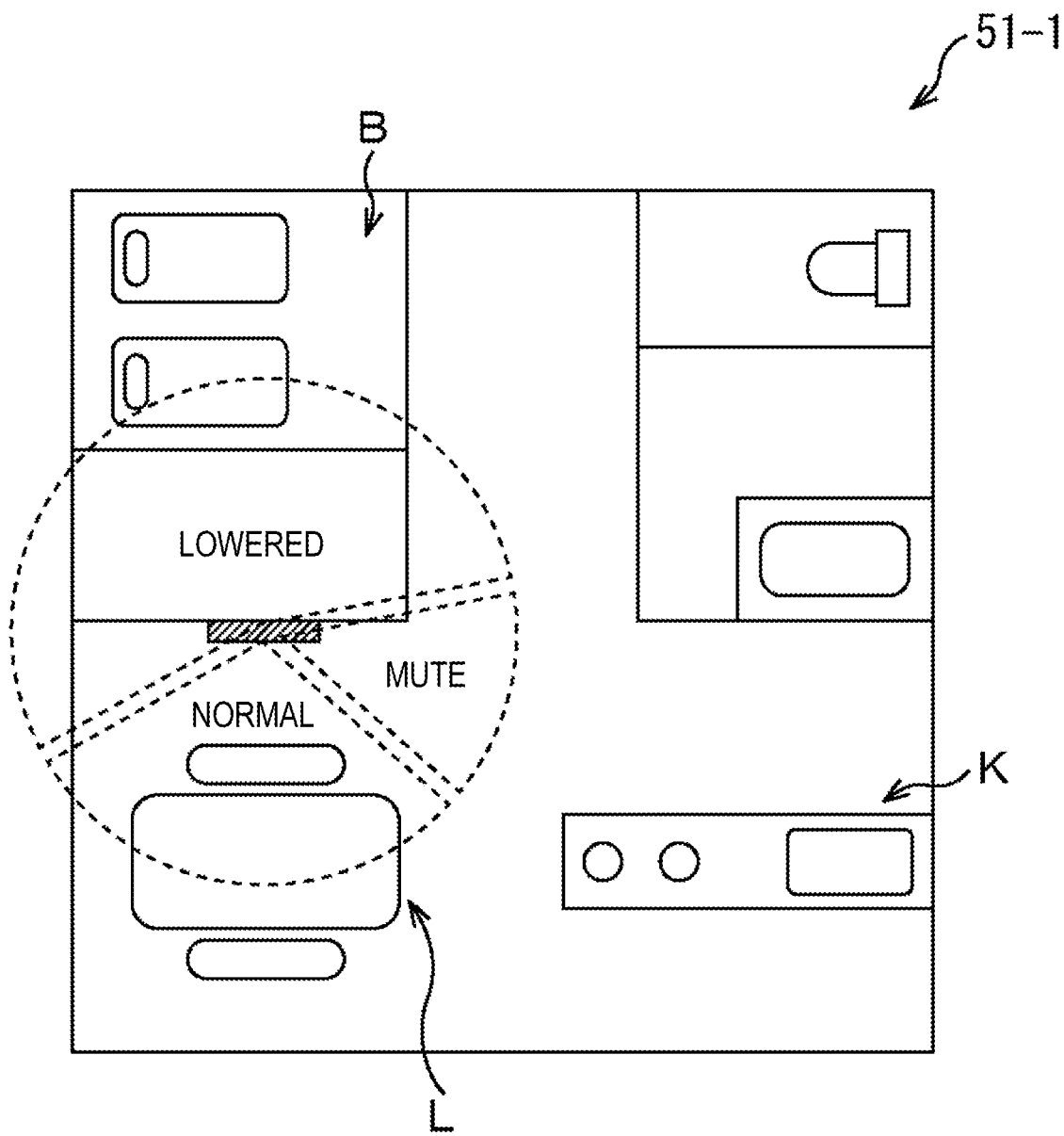
FIG. 4 is a diagram illustrating a first display example of a setting screen of an own space.

FIG. 4 illustrates a first display example of a setting screen for controlling a sound in the own space.

As illustrated in FIG. 4, a setting screen 51-1 of the own space displays a floor plan of rooms in the space S-1 being the own space, and volume can be controlled in an arbitrary direction and width around the communication apparatus 12-1 in the room layout.

FIG. 4 illustrates an example in which volume in a direction and a width in which the living room L exists with respect to the communication apparatus 12-1 is set to normal, volume in a direction and a width in which the kitchen K exists with respect to the communication apparatus 12-1 is set to mute, and volume in other directions and width is set to lowered. In other words, the user can set mute as a sound on the kitchen K side around the communication apparatus 12-1 so as not to transmit a sound on the kitchen K side to the partner side.

Aside from the setting for adjusting volume in this manner, in the communication apparatus 12, it is possible to perform a setting of changing a pitch (for example, changing a dish sound with a high pitch to a sound with a low pitch), or a setting of changing tone, in an arbitrary direction and width with respect to the communication apparatus 12, for example. Alternatively, in the communication apparatus 12, it is possible to perform a setting of changing sound pressure, frequency, or the like. Furthermore, in a case where the designation of a sound direction and width that is performed by the user does not fail within an allowable range in which control can be performed by the communication apparatus 12, for example, resetting is promoted by presenting an error, or control is performed in a limit direction and width of the allowable range.

Figure 5:
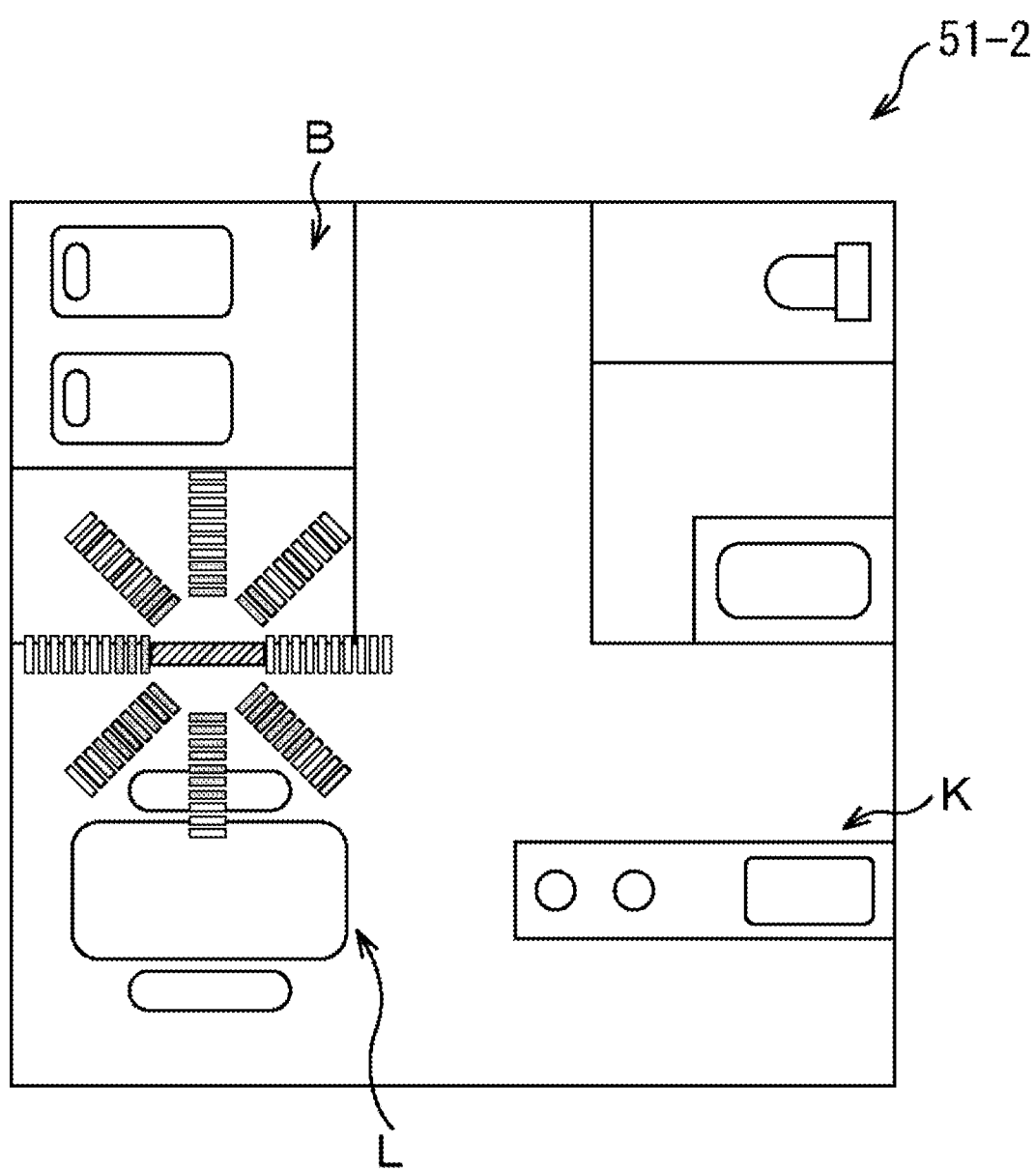
FIG. 5 is a diagram illustrating a second display example of a setting screen of the own space.

FIG. 5 illustrates a second display example of a setting screen for controlling a sound in the own space.

As illustrated in FIG. 5, a setting screen 51-2 of the own space displays a floor plan of rooms in the space S-1 being the own space, and volume can be controlled at every 45 degrees around the communication apparatus 12-1 in the room layout.

FIG. 5 illustrates an example in which calibrations indicating volume are displayed at every 45 degrees around the communication apparatus 12-1, and volume is set to magnitude indicated by hatching in the calibrations. Also in FIG. 5, similarly to FIG. 4, mute can be set as a sound on the kitchen K side so that a sound on the kitchen K side is not transmitted to the partner side.

Figure 6:
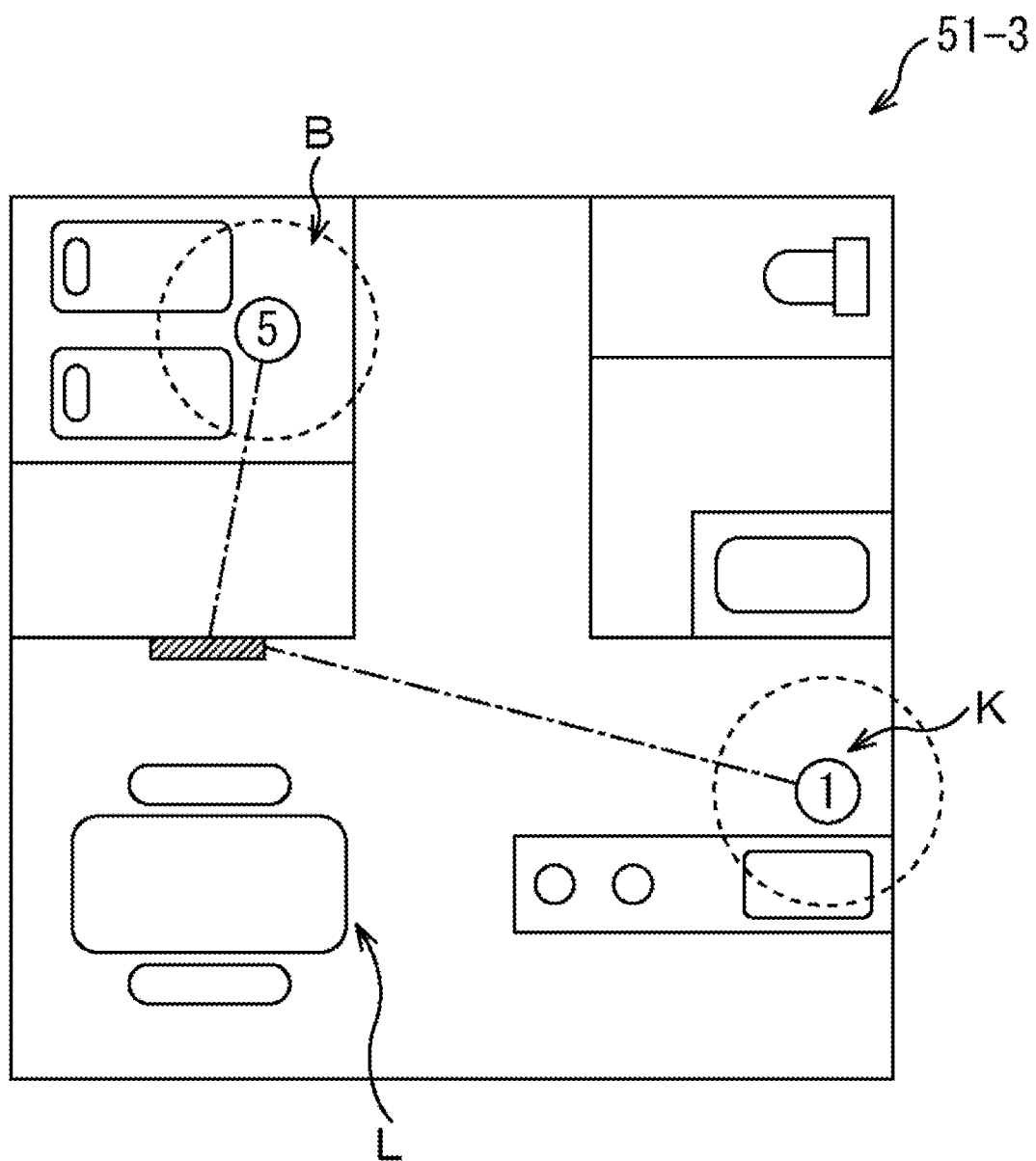
FIG. 6 is a diagram illustrating a third display example of a setting screen of the own space.

FIG. 6 illustrates a third display example of a setting screen for controlling a sound in the own space.

As illustrated in FIG. 6, a setting screen 51-3 of the own space displays a floor plan of rooms in the space S-1 being the own space, microphones are individually installed at locations in the room layout, and volume of sounds collected by these microphones installed at the locations can be controlled.

FIG. 6 illustrates an example in which volume of the microphone installed in the kitchen K is set to 1, and volume of the microphone installed in the bed room B is set to 5. In this manner, the user can input the positions and orientations in the floor plan of the own space of microphones and performance of the microphones, and set volume of sounds collected by these microphones that is set when the sounds are transmitted to the other space.

In this manner, in the communication apparatus 12, it is possible to control a sound in each room for each room in which a microphone is installed, and recognize the setting via the setting screen 51-3 of the own space.

Figure 7:
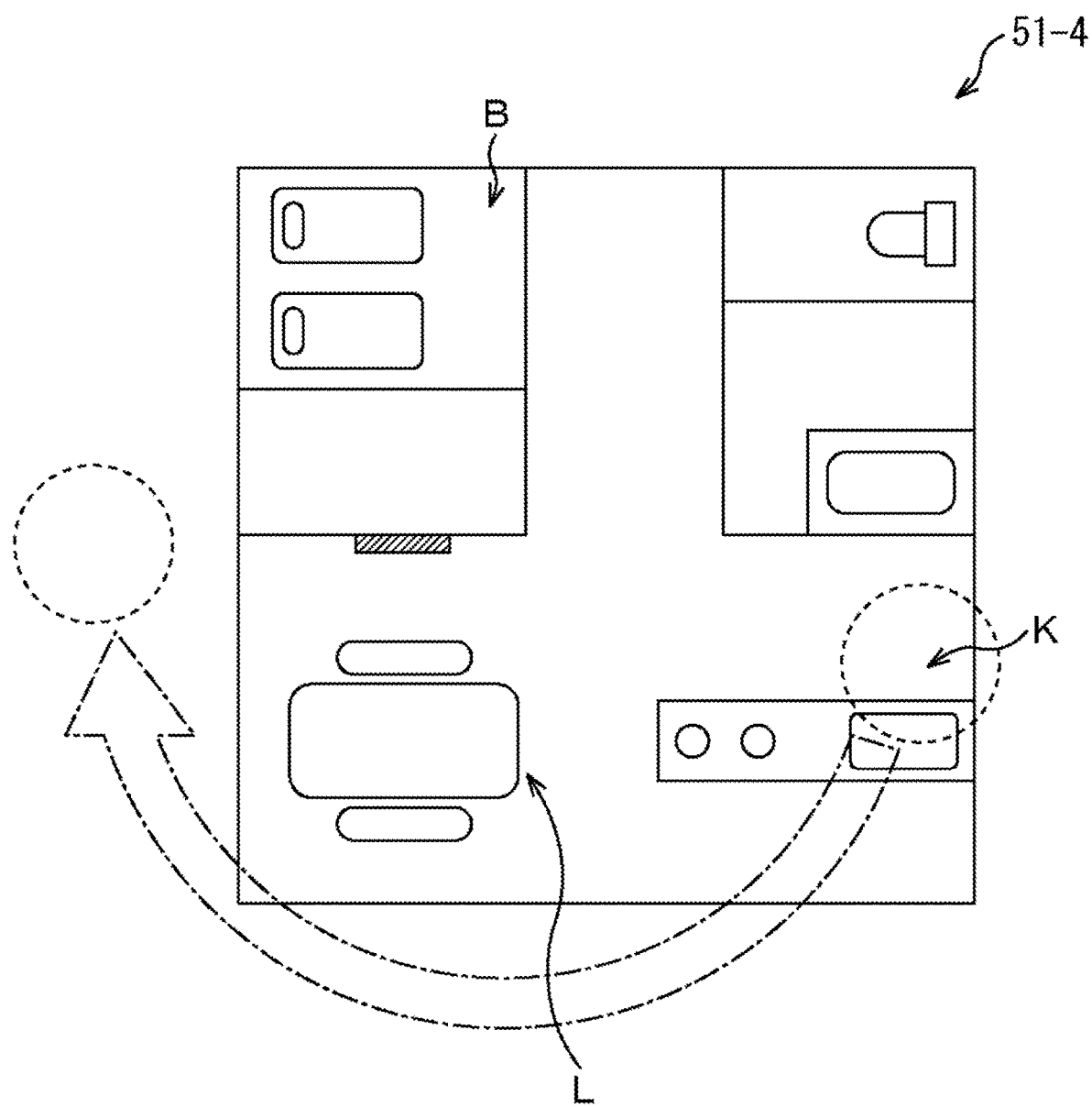
FIG. 7 is a diagram illustrating a fourth display example of a setting screen of the own space.

FIG. 7 illustrates a fourth display example of a setting screen for controlling a sound in the own space.

As illustrated in FIG. 7, a setting screen 51-4 of the own space displays a floor plan of rooms in the space S-1 being the own space, and a localization position of a sound image on the other space side in the room layout can be controlled.

FIG. 7 illustrates an example in which setting is performed to change a localization position of a sound image in such a manner that a sound on the kitchen K side is localized to the opposite side of the kitchen K with respect to the communication apparatus 12-1.

In this manner, in the communication apparatus 12, it is possible to control a position in the other space at which a sound in the own space in localized. Similarly, in the communication apparatus 12, a position in the own space at which a sound in the other space in localized may be controlled.

Figure 8:
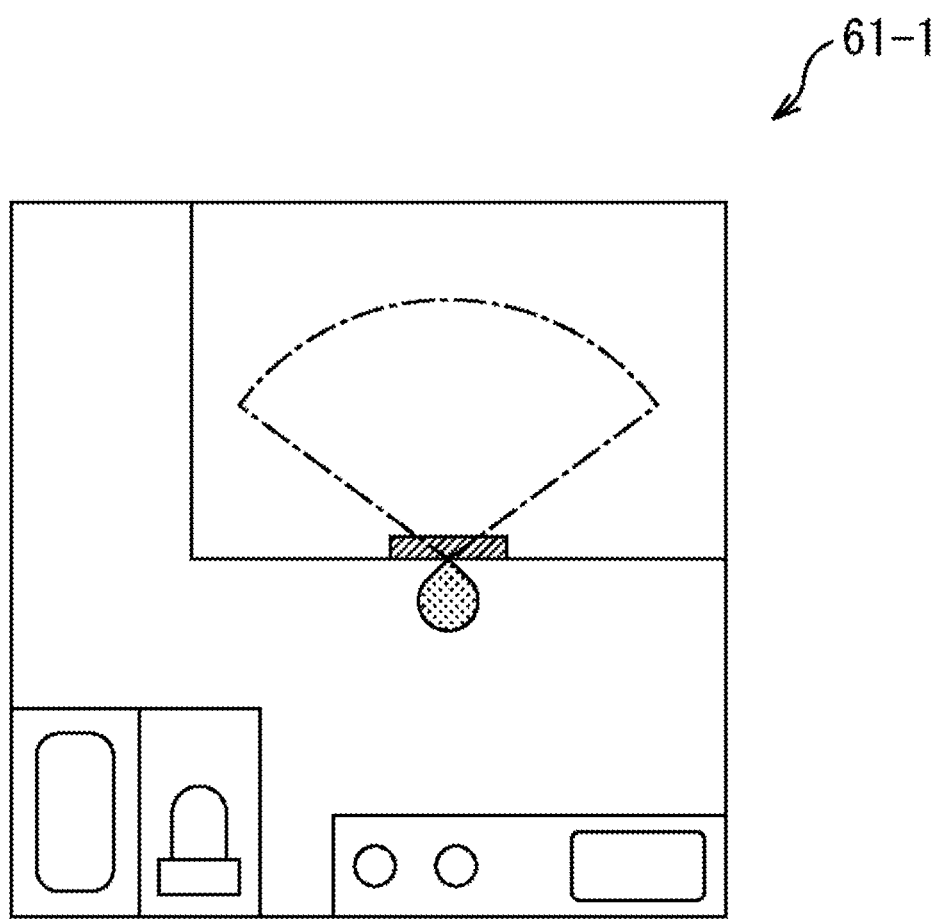
FIG. 8 is a diagram illustrating a first display example of a setting screen of an other space.

FIG. 8 illustrates a first display example of a setting screen for controlling a sound in the other space.

As illustrated in FIG. 8, a setting screen 61-1 of the other space displays a floor plan of rooms in the space S-2 being the other space, and illustrates where the user U-1 looks and which range is viewed from the user U-1, in a state in which the user U-1 faces the communication apparatus 12-1.

Then, the user U-1 can recognize the orientation of the user U-1 and a visible range via the communication apparatus 12-1, on the setting screen 61-1 of the other space, and control a sound in the other space for the floor plan of the space S-2, similarly to the control described with reference to FIGS. 4 to 7.

Note that, it is necessary for the user U-1 to easily recognize the space S-2 being the other space, and for example, a stereoscopic room layout may be displayed instead of a planar room layout as illustrated in FIG. 8.

FIG. 9 illustrates a second display example of a setting screen for controlling a sound in the other space.

FIG. 9 illustrates a setting screen 61-2 of the other space on which the user S-2 performs setting of sounds for the space S-1 being the other space. As illustrated in FIG. 9, on the setting screen 61-2 of the other space, it is possible to switch the orientation of the user S-2, and the user S-2 can select an easy-to-recognize screen of a setting screen 61-2A of the other space and a setting screen 61-2B of the other space. In other words, presentation of heading up can be performed as in the setting screen 61-2B of the other space.

Note that the floor plans of rooms that are displayed on the setting screens 51-1 to 51-4 and the setting screens 61-1 to 61-2 can be manually input by the user to the communication apparatus 12. For example, the user can input a floor plan in handwriting by performing a touch manipulation using a tablet terminal, or cause a floor plan to be read, by capturing, for example, an image of paper on which the floor plan is drawn, and using image recognition.

Figures 10, 11:
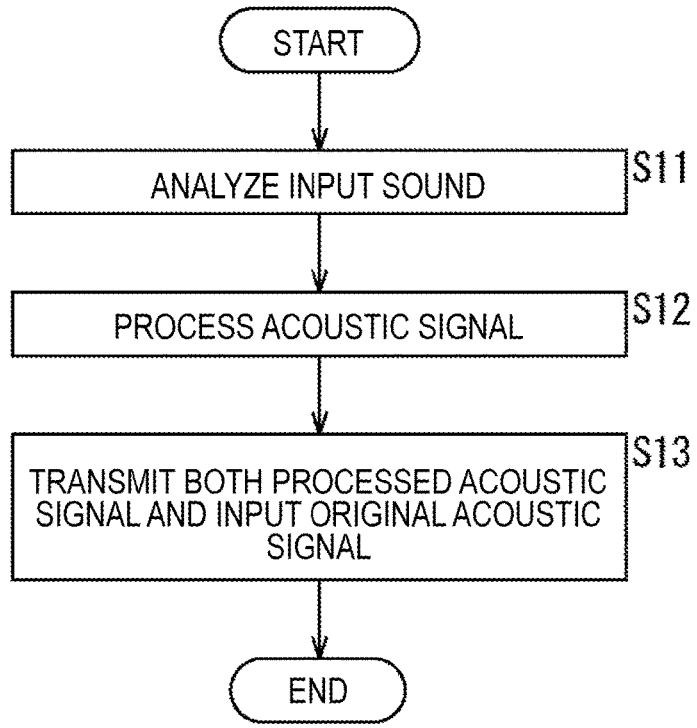
FIG. 10 is a diagram illustrating an example of setting information.
FIG. 11 is a flowchart describing processing of processing a sound in the own space and transmitting the sound.

Furthermore, FIG. 10 illustrates an example of setting information set using the setting screen described with reference to FIGS. 4 to 9.

FIG. 10 illustrates an example of setting volume, a pitch, tone, and a localization position in each orientation set when the front side of the communication apparatus 12 is assumed to be 90 degrees.

For example, it is possible to set 5 as the level of volume in an orientation of 45 degrees with respect to the communication apparatus 12, and set the pitch to decrease by 200 Hz. Furthermore, it is possible to set 8 as the level of volume in an orientation of 225 degrees with respect to the communication apparatus 12, and set the localization position to an orientation of 45 degrees with respect to the communication apparatus 12. In addition to this, using the setting information, it is possible to set whether or not to perform sound processing by the own space sound processing unit 31 or the other space sound processing unit 34, and it is possible to decide whether or not to control a sound, depending on the will of the user.

Sound Setting Processing

Sound control processing performed in the telepresence system 11 in FIG. 1 will be described with reference to flowcharts in FIGS. 11 to 14.

FIG. 11 is a flowchart describing processing of processing a sound in the own space and transmitting the sound.

In step S11, an acoustic signal representing sounds collected by a plurality of microphones 13 is input from the input apparatus 21 to the own space sound processing unit 31 and the transmission apparatus 22. Then, the own space sound processing unit 31 can identify orientations, volumes, pitches, tones, or the like of the input sounds by analyzing these sounds.

In step S12, the own space sound processing unit 31 processes the acoustic signal input in step S11, on the basis of sound information stored in the own space sound information storage unit 33, and supplies the acoustic signal to the transmission apparatus 22.

In step S13, the transmission apparatus 22 transmits both the processed acoustic signal supplied from the own space sound processing unit 31 in step S12, and the original acoustic signal input from the input apparatus 21 in step S11.

Figure 12:
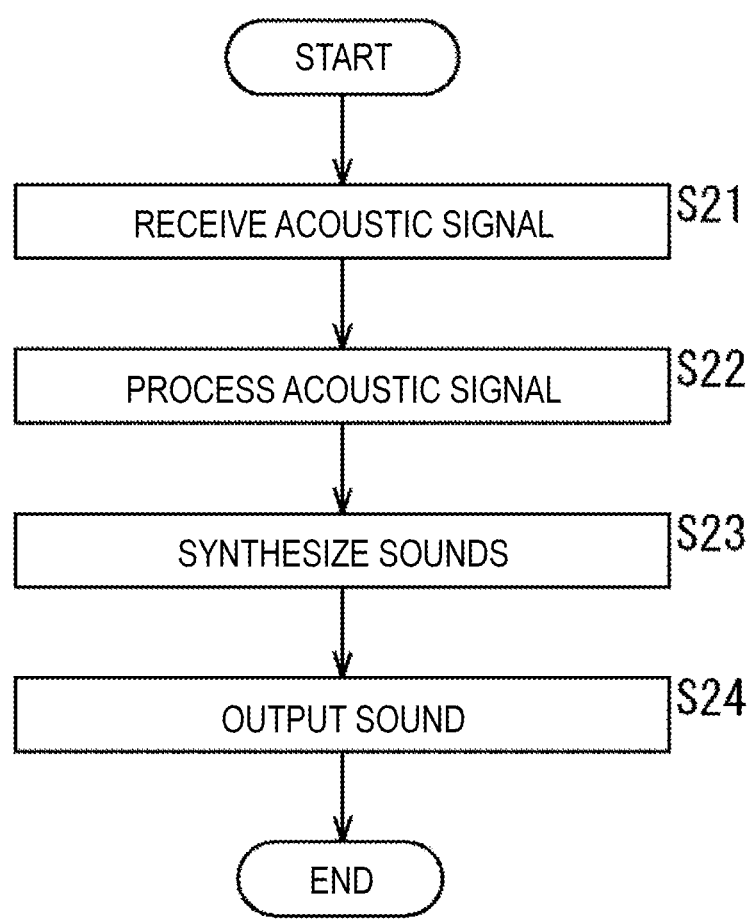
FIG. 12 is a flowchart describing processing of outputting a sound in the other space.

FIG. 12 is a flowchart describing processing of outputting a sound in the other space.

In step S21, the receiving apparatus 23 receives the acoustic signal transmitted in step S13 in FIG. 11, and supplies the acoustic signal to the other space sound processing unit 34.

In step S22, the other space sound processing unit 34 processes the acoustic signal input in step S21, on the basis of sound information stored in the other space sound information storage unit 36. Note that the process in step S22 is skipped for a sound that cannot be processed on the other space side, such as a sound deadened on the own space side.

In step S23, the other space sound processing unit 34 synthesizes sounds in accordance with the configuration of a plurality of speakers 15, on the basis of the acoustic signal processed in step S22.

In step S24, the output apparatus 24 outputs the sound synthesized in step S23, from the speakers 15.

Figure 13:
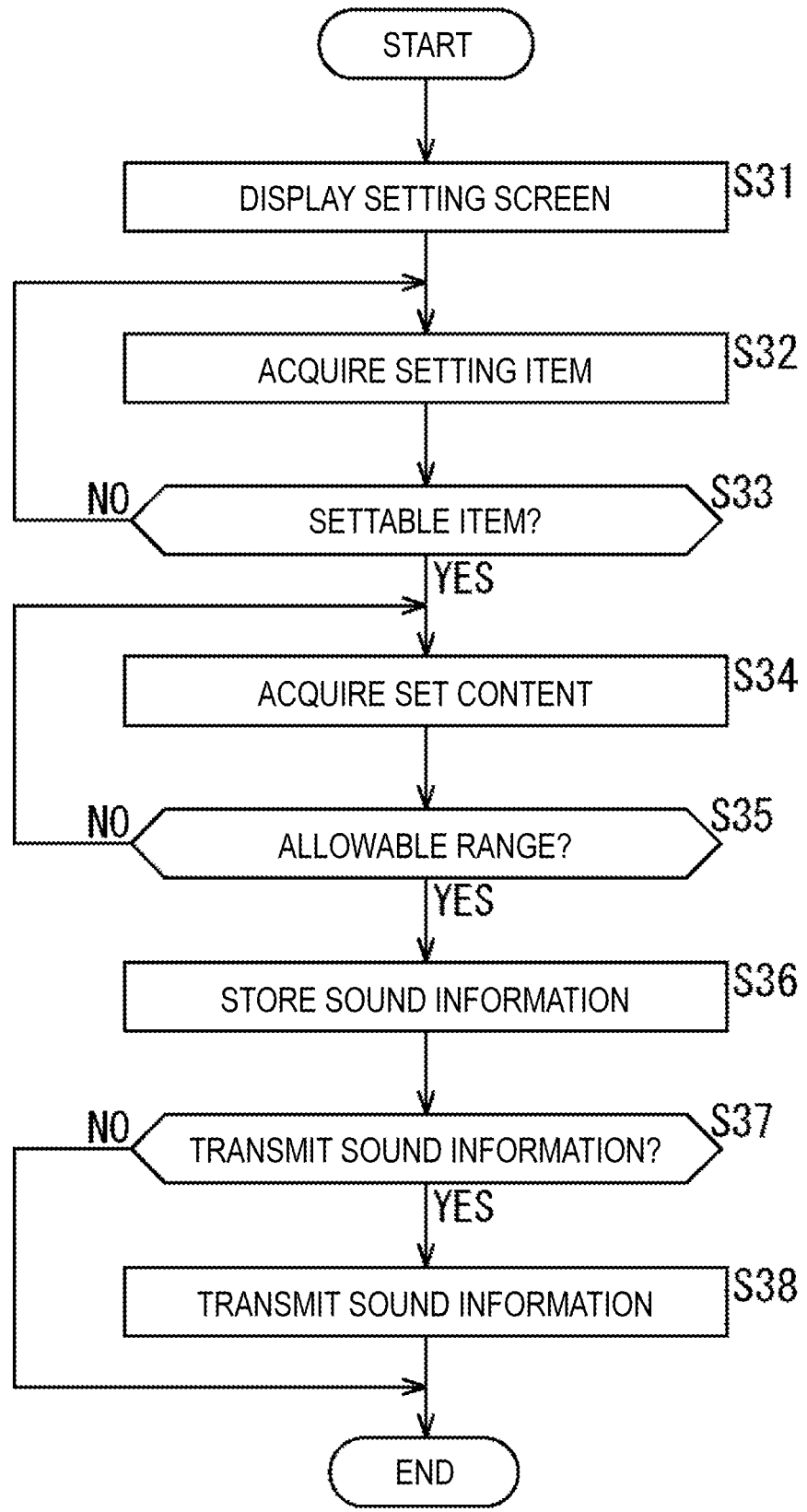
FIG. 13 is a flowchart describing processing of setting sound information of the other space.

FIG. 13 is a flowchart describing processing of setting sound information of the other space.

In step S31, in accordance with a manipulation performed by the user, the own space sound information setting determination unit 32 displays a setting screen of the other space on the output apparatus 24.

In step S32, if the user designates setting items (volume, pitch, tone, and localization position) of sound information, the other space sound information setting determination unit 35 acquires the setting items.

In step S33, the other space sound information setting determination unit 35 determines whether or not setting items acquired in step S32 are settable items, and in a case where it is determined that the setting items are not settable items, the processing returns to step S32, in which an error is presented and designation is performed again by the user.

On the other hand, in a case where the other space sound information setting determination unit 35 determines in step S33 that the setting items are settable items, the processing proceeds to step S34. In step S34, if the user designates set content for setting items (for example, a level of volume, a direction of a localization position, etc.), the other space sound information setting determination unit 35 acquires the set content.

In step S35, the other space sound information setting determination unit 35 determines whether or not the set content acquired in step S34 falls within the allowable range, and in a case where it is determined that that the set content does not fall within the allowable range, the processing returns to step S34, in which an error is presented and designation is performed again by the user.

On the other hand, in a case where the other space sound information setting determination unit 35 determines in step S35 that the set content falls within the allowable range, the processing proceeds to step S36. In step S36, the other space sound information setting determination unit 35 updates sound information stored in the other space sound information storage unit 36, using the set content.

In step S37, the other space sound information setting determination unit 35 determines whether or not to transmit the sound information updated in step S36, to the partner side, and in a case where it is determined to transmit the sound information, the sound information is transmitted by the transmission apparatus 22 in step S38, and then, the processing is ended. On the other hand, in a case where it is determined in step S37 not to transmit the sound information, step S38 is skipped and the processing is ended. Note that, similarly to the other space sound information setting determination unit 35, the own space sound information setting determination unit 32 can also perform processing of setting sound information of the own space, and update sound information stored in the own space sound information storage unit 3.

Figure 14:
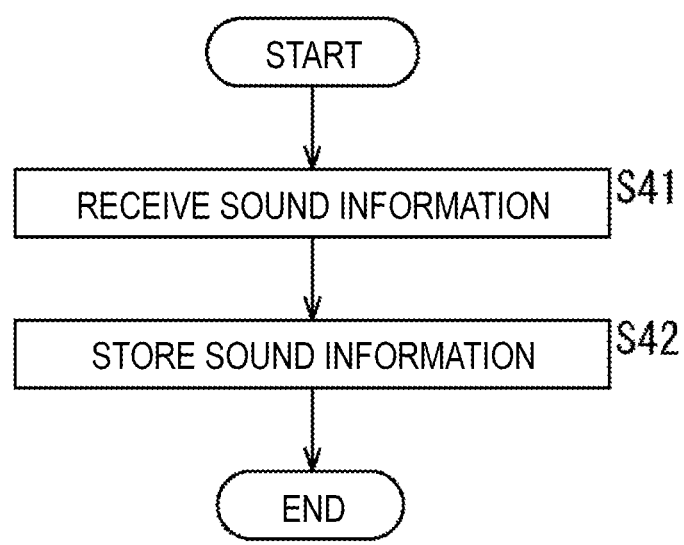
FIG. 14 is a flowchart describing processing of storing sound information.

FIG. 14 is a flowchart describing processing of storing sound information.

In step S41, the receiving apparatus 23 receives the sound information transmitted in step S38 in FIG. 13.

In step S42, the receiving apparatus 23 supplies the sound information received in step S41, to the own space sound information storage unit 33 and stores the sound information thereinto, and the processing is ended.

Note that, in this case, two types of upsides including information set by the user and information set by the other user are stored in the own space sound information storage unit 33. Accordingly, a priority degree indicating which information is to be prioritized may be set, or a priority degree may be preset depending on the system.

Note that, in the telepresence system 11, sound processing can be performed using whichever of the communication apparatus 12-1 and the communication apparatus 12-2. For example, as indicated by broken lines in FIG. 3, a sound processed by an other space sound processing unit 34-2 can be transmitted to the communication apparatus 12-1 by a the transmission apparatus 22-2, and output. With this configuration, depending on the sound processing content, it is possible to save a communication band, and avoid transmitting a sound in a direction in which volume is set to 0, for example. Furthermore, at this time, what type of processing is set by the partner may be displayed on the own space side.

Furthermore, in the communication apparatus 12, for example, it is possible to perform fade-in for suppressing uncomfortable feeling toward rapidly hearing a sound when a user moves from a range in which volume is set to mute, to a range in which volume is set to normal (for example, from the kitchen K to the living room L in FIG. 4). That is, a sound can be controlled in such a manner that volume gradually increases from the range in which volume is set to mute, toward the range in which volume is set to normal. With this configuration, for example, it is possible to avoid rapidly hearing a loud vacuum sound when a user moves from the range in which volume is set to mute, toward the range in which volume is set to normal, while using a vacuum.

Furthermore, in contrast, in the communication apparatus 12, a sound may be controlled in such a manner that volume gradually decreases from the range in which volume is set to normal, toward the range in which volume is set to mute, so as to fade out.

Hardware Configuration Example of Computer

Note that processes described with reference to the aforementioned flowchart need not always be chronologically processed in the orders described as flowcharts, and include processes executed in parallel or individually (for example, parallel processing or processing performed by an object). Furthermore, the programs may be programs processed by a single CPU, or may be programs processed by a plurality of CPUs in a distributed manner.

Furthermore, the aforementioned series of processes (communication method) can be executed by hardware, and can be executed by software. In a case where the series of processes are executed by software, programs constituting the software are installed from a program recording medium on which the programs are recorded, onto a computer incorporated into dedicated hardware, or a general-purpose personal computer that can execute various functions by installing various programs, or the like, for example.

Figure 15:
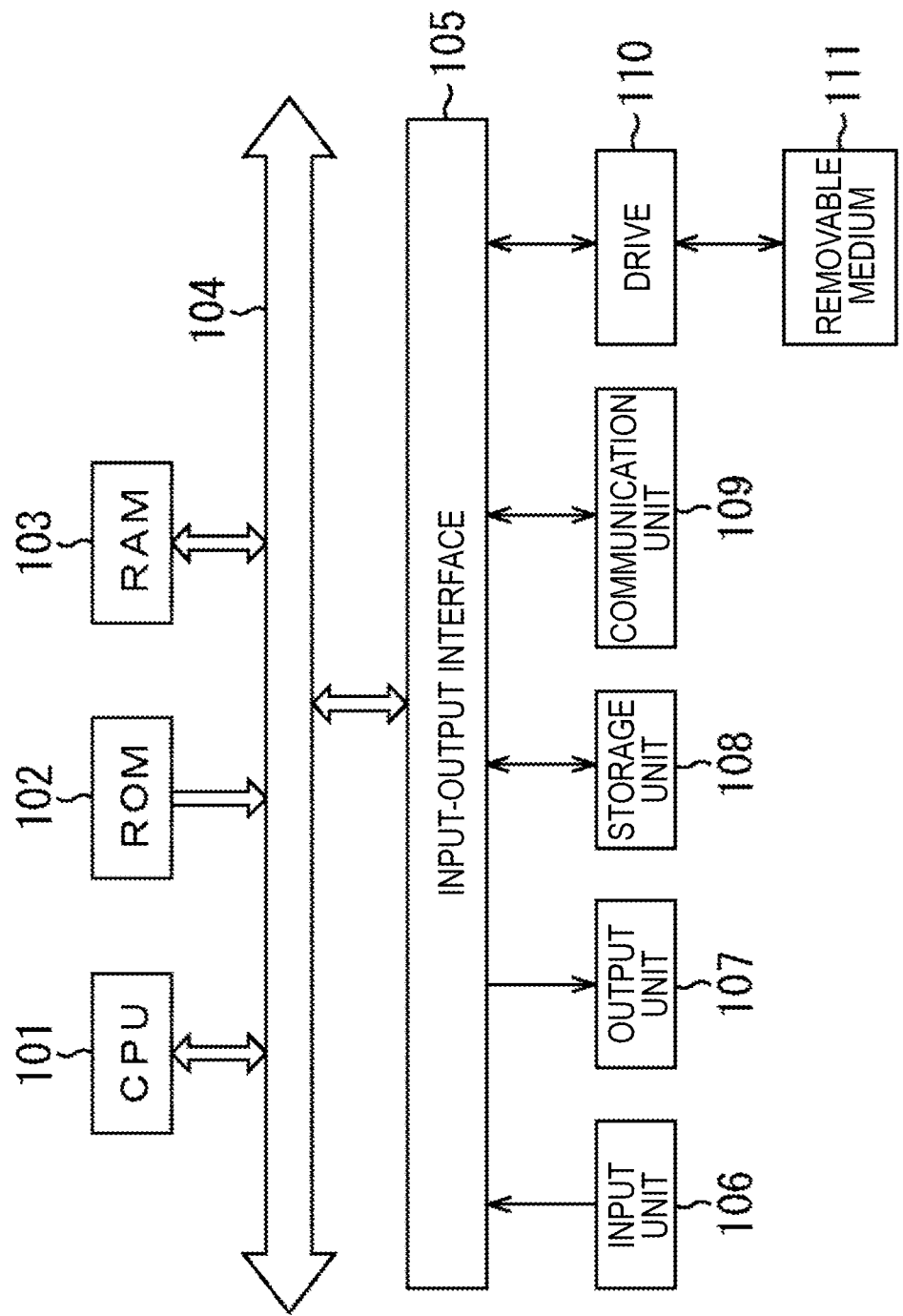
FIG. 15 is a block diagram illustrating a configuration example of as embodiment of a computer to which the present technology is applied.

FIG. 15 is a block diagram illustrating a configuration example of hardware of a computer that executes the aforementioned series of processes according to programs.

In a computer, a Central Processing Unit (CPU) 101, a Read Only Memory (ROM) 102, and a Random Access Memory (RAM) 103 are connected to one another via a bus 104.

An input-output interface 105 is further connected to the bus 104. An input unit 106 including a keyboard, a mouse, a microphone or the like, an output unit 107 including a display, a speaker, or the like, a storage unit 108 including a hard disc, a nonvolatile memory, or the like, a communication unit 109 including a network interface or the like, and a drive 110 that drives a removable medium 111 such as a magnetic disc, an optical disc, a magnetic optical disc, or a semiconductor memory are connected to the input-output interface 105.

In the computer having the above-described configuration, the aforementioned series of processes are performed by the CPU 101 loading programs stored in, for example, the storage unit 108, into the RAM 103 via the input-output interface 105 and the bus 104, and executing the programs.

The programs to be executed by the computer (CPU 101) are provided with being recorded on the removable medium 111 being a package medium including, for example, a magnetic disc (including flexible disk), an optical disc (compact disc-read only memory (CD-ROM), a digital versatile disc (DVD), etc.), a magnetic optical disc, or a semiconductor memory, or the like, or via a wired or wireless transmission medium such as a local area network, the Internet, or digital satellite broadcasting.

Then, the programs can be installed on the storage unit 108 via the input-output interface 105 by attaching the removable medium 111 to the drive 110. Furthermore, via a wired or wireless transmission medium, the programs can be received by the communication unit 109 and installed on the storage unit 108. Yet alternatively, the program can be preinstalled on the ROM 102 and the storage unit 108.

Combination Example of Configurations

Note that the present technology can employ the following configurations.

(1)

A communication apparatus including a sound processing unit configured to process, in accordance with a setting for a specific sound, the sound in performing communication using a video and a voice.

(2)

The communication apparatus according to (1) described above, further including:

an input unit configured to input the sound; and a transmission unit configured to perform transmission to another communication apparatus, in which the sound processing unit performs processing on the sound input by the input unit, and the transmission unit transmits both the sound processed by the sound processing unit, and the original sound input by the input unit.

(3)

The communication apparatus according to (1) or (2) described above, further including:

a receiving unit configured to receive a sound transmitted from another communication apparatus; and an output unit configured to output the sound, in which the sound processing unit performs processing on the sound received by the receiving unit, and causes the sound to be output from the output unit.

(4)

The communication apparatus according to any of (1) to (3) described above, in which the sound processing unit performs at least one processing of adjustment of volume, a change of tone, a change of a pitch, or a change of a localization position of a sound image.

(5)

The communication apparatus according to according to any of (1) to (4) described above, in which whether or not to perform processing by the sound processing unit is settable.

(6)

The communication apparatus according to any of (1) to (5) described above, further including a display unit configured to display a setting screen for controlling the sound, in which a room layout of a room in which communication is performed using a video and a voice is displayed on the setting screen, and a direction and a width of a sound to be processed are set by a user.

(7)

The communication apparatus according to (6) described above, further including a determination unit configured to determine whether or not a setting performed for a sound by the user falls within an allowable range.

(8)

A communication method including a step of processing, in accordance with a setting for a specific sound, the sound in performing communication using a video and a voice.

(9)

A program for causing a computer to execute processing including a step of processing, in accordance with a setting for a specific sound, the sound in performing communication using a video and a voice.

(10)

A telepresence system including a sound processing unit configured to process, in accordance with a setting for a specific sound, the sound in performing communication using a video and a voice.

Note that the present embodiment is not limited to the aforementioned embodiment, and various changes can be made without departing from the scope of the present disclosure.

REFERENCE SIGNS LIST

11 Presence system
12 Communication apparatus
13 Microphone
14 Camera
15 Speaker
16 Display
17 Manipulation signal input unit
18 Control apparatus
21 Input apparatus
22 Transmission apparatus
23 Receiving apparatus
24 Output apparatus
25 Sound processing unit
31 Own space sound processing unit
32 Own space sound information setting determination unit
33 Own space sound information storage unit
34 Other space sound processing unit
35 Other space sound information setting determination unit
36 Other space sound information storage unit

The invention claimed is:

1. A communication apparatus comprising:
an input unit configured to input an acoustic signal representing a plurality of sounds;
a sound processing unit configured to process, in accordance with a setting for a specific sound of the plurality of sounds, the acoustic signal in performing communication using a video and a voice;
a transmission unit configured to perform transmission to another communication apparatus; and
a display unit configured to display a setting screen for controlling the acoustic signal,
wherein a room layout of a room in which the communication is performed is displayed on the setting screen, and an arbitrary direction and an arbitrary width of the acoustic signal to be processed are set by a user,
wherein the transmission unit transmits both the acoustic signal and the processed acoustic signal to the another communication apparatus, and
wherein the input unit, the sound processing unit, and the transmission unit are each implemented via at least one processor.

2. The communication apparatus according to claim 1, further comprising:
a receiving unit configured to receive another acoustic signal transmitted from another communication apparatus; and
an output unit configured to output the another acoustic signal,
wherein the sound processing unit performs processing on the another acoustic signal received by the receiving unit, and causes the another acoustic signal to be output from the output unit, and
wherein the receiving unit and the output unit are each implemented via at least one processor.

3. The communication apparatus according to claim 1, wherein the sound processing unit performs at least one processing of adjustment of volume, a change of tone, or a change of a pitch.

4. The communication apparatus according to claim 1, wherein whether or not to perform processing by the sound processing unit is settable.

5. The communication apparatus according to claim 1, further comprising
a determination unit configured to determine whether or not a setting performed for the acoustic signal by the user falls within an allowable range,
wherein the determination unit is implemented via at least one processor.

6. The communication apparatus according to claim 1, wherein the sound processing unit further performs processing of adjustment of a change of a localization position of a sound image.

7. The communication apparatus according to claim 6, wherein the room layout of the room in which the communication is performed includes the localization position of the sound image, and the localization position in the room layout is changed to another localization position in the room layout based on the adjustment of the change of the localization position.

8. A communication method comprising:
inputting an acoustic signal representing a plurality of sounds;
processing, in accordance with a setting for a specific sound of the plurality of sounds, the acoustic signal in performing communication using a video and a voice;
transmitting both the acoustic signal and the processed acoustic signal to another communication apparatus; and
displaying a setting screen for controlling the acoustic signal,
wherein a room layout of a room in which the communication is performed is displayed on the setting screen, and an arbitrary direction and an arbitrary width of the acoustic signal to be processed are set by a user.

9. A non-transitory computer-readable medium having embodied thereon a program, which when executed by a computer causes the computer to execute a communication method, the method comprising:
inputting an acoustic signal representing a plurality of sounds;
processing, in accordance with a setting for a specific sound of the plurality of sounds, the acoustic signal in performing communication using a video and a voice;
transmitting both the acoustic signal and the processed acoustic signal to another communication apparatus; and
displaying a setting screen for controlling the acoustic signal,
wherein a room layout of a room in which the communication is performed is displayed on the setting screen, and an arbitrary direction and an arbitrary width of the acoustic signal to be processed are set by a user.

10. A telepresence system comprising:
a communication apparatus comprising
an input unit configured to input an acoustic signal representing a plurality of sounds,
a sound processing unit configured to process, in accordance with a setting for a specific sound of the plurality of sounds, the acoustic signal in performing communication using a video and a voice,
a transmission unit configured to perform transmission to another communication apparatus, and
a display unit configured to display a setting screen for controlling the acoustic signal; and
the another communication apparatus,
wherein a room layout of a room in which the communication is performed is displayed on the setting screen, and an arbitrary direction and an arbitrary width of the acoustic signal to be processed are set by a user,
wherein the sound processing unit performs processing on the acoustic signal,
wherein the transmission unit transmits both the acoustic signal and the processed acoustic signal to the another communication apparatus, and
wherein the input unit, the sound processing unit, and the transmission unit are each implemented via at least one processor.

\* \* \* \* \*